May 19, 1970  J. D. BRYANT  3,512,715

IRRIGATION APPARATUS

Filed March 8, 1968  3 Sheets-Sheet 1

INVENTOR.
John Dennis Bryant
BY *Jones & Thomas*

ATTORNEYS

May 19, 1970     J. D. BRYANT     3,512,715

IRRIGATION APPARATUS

Filed March 8, 1968     3 Sheets-Sheet 2

INVENTOR.
John Dennis Bryant
BY
Jones & Thomas
ATTORNEYS

May 19, 1970　　　J. D. BRYANT　　　3,512,715
IRRIGATION APPARATUS

Filed March 8, 1968　　　3 Sheets-Sheet 3

INVENTOR.
John Dennis Bryant
BY Jones & Thomas
ATTORNEYS

United States Patent Office 3,512,715
Patented May 19, 1970

3,512,715
IRRIGATION APPARATUS
John Dennis Bryant, Rte. 1, Macon, Ga. 30004
Filed Mar. 8, 1968, Ser. No. 716,689
Int. Cl. B05b 3/00
U.S. Cl. 239—189                                 6 Claims

ABSTRACT OF THE DISCLOSURE

An irrigation apparatus wherein a conduit is connected at one of its ends to a source of pressurized liquid, and control means moves from the other end of the conduit toward the source of liquid and progressively opens the conduit along its length and extracts the pressurized liquid therefrom and spreads it over the surrounding land. The conduit includes a seam along its length, and the control apparatus includes an opening element for opening the conduit as it moves in one direction and closing the conduit as it moves in the opposite direction. The control apparatus also includes a reel for collecting the opened conduit, and an hydraulic piston assembly for gripping the opened portion of the conduit and moving the control apparatus along the length of the conduit.

BACKGROUND OF THE INVENTION

When irrigating large areas of land, such as a farm, a central source of water is usually utilized to supply water to a large land area. A plurality of pipes and water spraying apparatus is required to transport the water to the desired location and disperse the water over the land. While some of the pipes are permanently installed, at least a major portion of the pipes must be removed from the land when the land is being tilled, and due to the cost of the pipes, only a small number of pipes are usually used to irrigate a large area by repositioning temporary pipes about the land area. Of course, the continual repositioning of pipes is time consuming and hard work, and even when a large supply of temporary pipes is available, the irrigation system is usually not very versatile in that new land area usually cannot be reached by a system planned for another land area, and it is difficult to extend the conduit system around curves or over hills in the land.

Various wheeled irrigation apparatus have been developed for spreading water over land. One of the more successful apparatus has been the type which reels in a flexible hose in such a manner that the water sprayer virtually walks up the hose toward the source of water pressure. With this arrangement the hose can be extended from the source of water pressure in the direction it is desired to irrigate; however, as the hose is reeled in, the weight of the hose and the weight of the water in the hose on the reel is added to the apparatus, the volume of the water in the hose is added to the volume of the hose itself which extends about the reel, and the water must travel the full length of the hose, which results in loss of pressure. Thus, the weight of the apparatus, the volume of the hose on the reel and pressure loss is such that only short lengths of hose can be reeled in before the apparatus must be repositioned.

SUMMARY OF THE INVENTION

Briefly described, the present invention comprises apparatus for transporting water which is usable in an irrigation system and includes a flexible conduit connected at one of its ends to a source of water, and has an openable seam extending along its length. A control apparatus is connected to the conduit and includes a seam opening member for opening the conduit, an extracting tube for directing the water from the conduit toward a point of delivery conduit gripping means for moving the control apparatus along the conduit, and a reel for reeling in or playing out the opened portion of the conduit as the control apparatus moves along the conduit.

Thus, it is an object of this invention to provide an apparatus for irrigating land in virtually any direction from a source of pressurized water, and at extended lengths from the source of water.

Another object of this invention is to provide apparatus for transporting liquid wherein liquid from a conduit is continuously passed through the conduit, and the conduit is progressively collected in an empty condition.

Another object of this invention is to provide apparatus for irrigating land which is inexpensive to produce and operate, and which operates over virtually any terrain and in any direction from a source of water.

Other objects, features and advantages of the present invention will become apparent upon reading the following specification, when taken in conjunction with the accompanying drawing.

DESCRIPTION OF THE PREFERRED EMBODIMENTS

Figure 1:
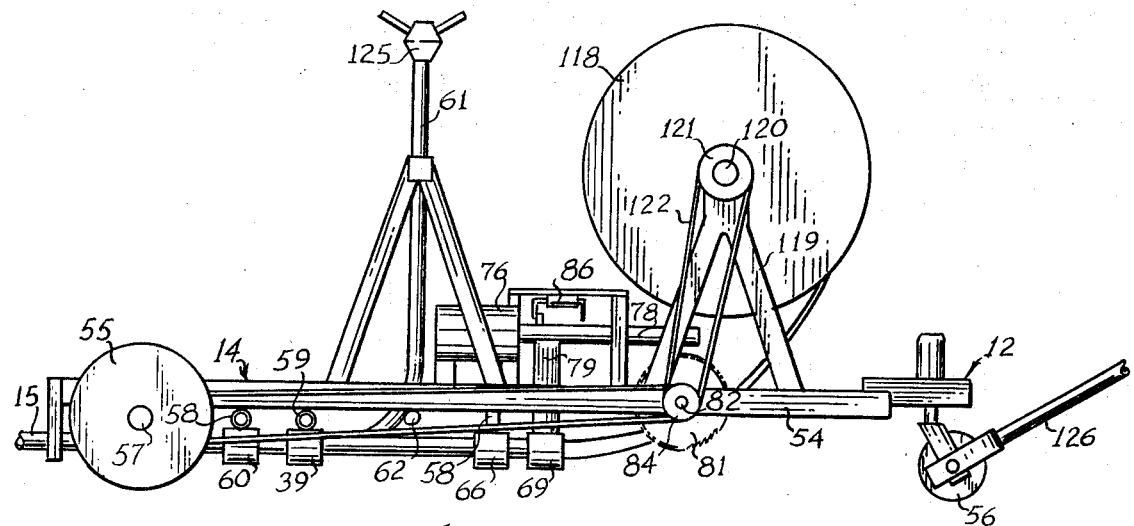
FIG. 1 is a side elevational view of the control apparatus of the irrigation apparatus.
Figure 3:
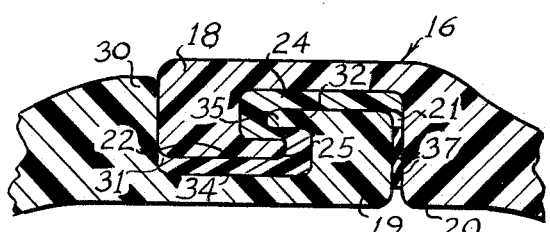
FIG. 3 is a detail showing of the seam of the flexible conduit.

Referring now more particularly to the drawing, in which like numerals indicate like parts throughout the several views, FIG. 1 shows irrigation apparatus 12 which includes control cart 14 and hose or conduit 15. As is shown in FIG. 3, conduit 15 is fabricated from a flexible substance, such as flexible plastic, and includes an openable seam 16 which extends along its length. Seam 16 includes inwardly facing joint 18 and outwardly facing joint 19 which are similar to each other in cross-sectional configuration. Joint 18 includes heel 20, socket 21 and locking runner 22. Socket 21 includes liner 24 along its interior surface. Liner 24 and runner 22 together form protrusion 25 which faces inwardly of socket 21. Outwardly facing joint 19 includes heel 30, socket 31, runner 32, liner 34, and protrusion 35. Protrusions 25 and 35 fit into sockets 31 and 21 in such a manner that they engage liners 34 and 24. Heels 20 and 30 are shaped so that the components of seam 16 are substantially continuous with the walls of tube 15 when soft material 37 is secured to socket 21 adjacent heel 20. With this arrangement, when joints 18 and 19 are connected together, strip 37 will be compressible so as to allow runner 32 to be received within socket 21 of joint 18. When conduit 15 is filled with pressurized fluids, strip 37 will assist in sealing seam 16.

As the pressure of the liquid in conduit 15 exerts a force on seam 16, protrusions 25 and 35 of joints 18 and 19 will be urged into the sockets 31 and 21 of the opposite joint to positively connect the joints together. Liners 24 and 34 are fabricated of a more rigid material, such as nylon, so that the bending forces encountered in joints 18 and 19 will be felt primarily by liners 24 and 34. The shape of liners 24 and 34 at their point of connection with each other is such that as more force is applied to seam 16, the liners engage each other more firmly.

Figure 4:
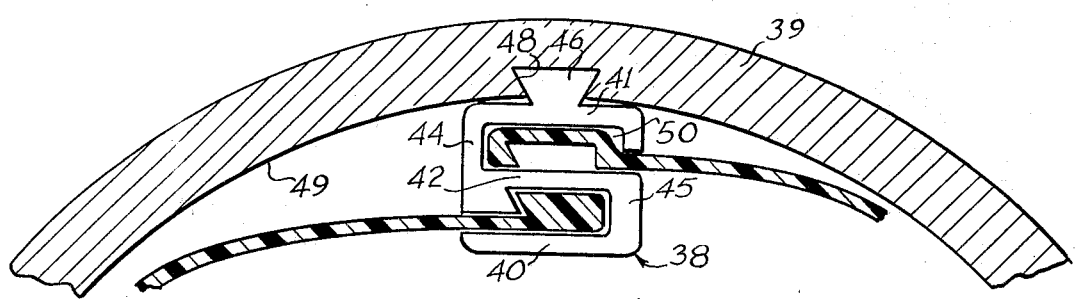
FIG. 4 is a transverse cross-sectional view of the seam opening sleeve.
Figure 5:
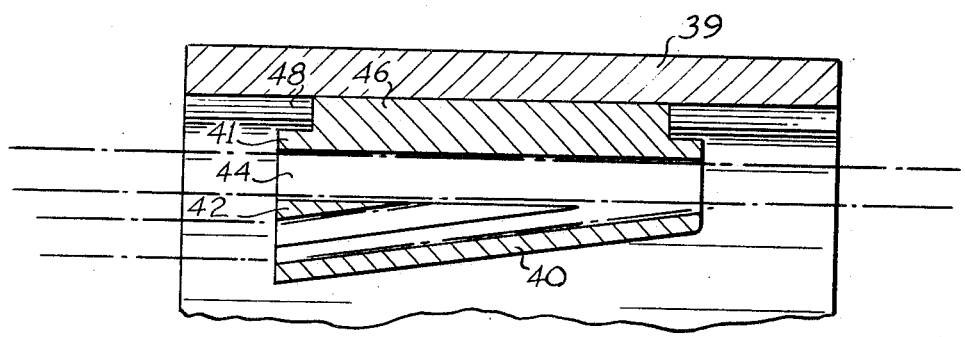
FIG. 5 is a longitudinal cross-sectional view of the seam opening device.

As is shown in FIGS. 4 and 5, seam opening element 38 is carried by conduit opening sleeve 39. Opening element 38 is generally Z-shaped and includes lower and upper lateral legs 40 and 41, dividing leg 42, and side legs 44 and 45. Wedge-shaped stem 46 is connected to the upper surface of upper lateral leg 41 and fits into wedge-shaped slot 48 defined in the interior surface 49 of conduit opening sleeve 39. Dividing leg 42 is shorter than lateral legs 40 and 41, and lateral legs 40 and 41 converge toward each other behind dividing leg 42 (FIG. 5). Opening element 38 is inserted about seam 15 in such a manner that inwardly facing joint 18 of the seam fits into space 50 between upper lateral leg 41 and dividing leg 42, while outwardly facing joint 19 fits into space 51 between lower lateral leg 40 and dividing leg 42. With this arrangement, when opening element 38 is moved along seam 16, it will urge joints 18 and 19 toward or away from each other, and into or out of locking engagement, depending upon the direction in which opening element 38 is moved.

Figure 2:
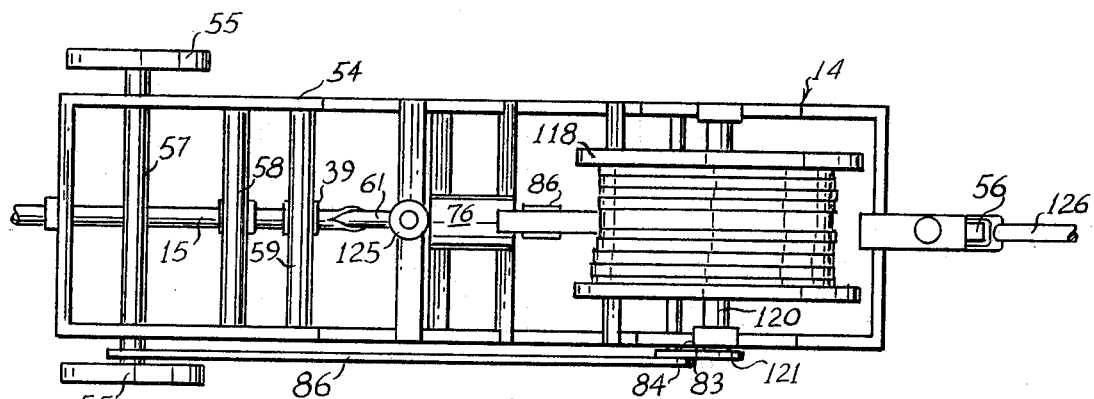
FIG. 2 is a plan view of the control apparatus.
Figure 7:
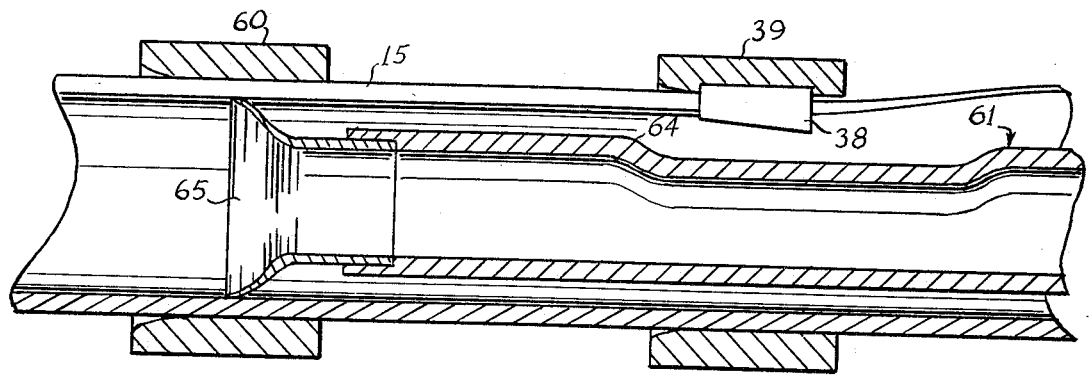
FIG. 7 is a cross-sectional view of the sealing end of the extractor tube and the sealing sleeve and conduit opening sleeve.

As is shown in FIGS. 1 and 2, control cart 14 includes frame 54 which is carried by front wheels 55 and rear caster wheel 56. Frame cross members 58 and 59 carry sealing sleeve 60 and conduit opening sleeve 39. L-shaped extractor or sprinkler pipe 61 is supported by frame cross piece 62. The lower horizontal leg 64 of extractor pipe 61 extends through conduit opening sleeve 39 (FIG. 7), and into sealing sleeve 60. A flexible funnel seal 65 surrounds the end of horizontal leg 64 of pipe 61 and flares outwardly toward sealing sleeve 60. Thus, as conduit 15 is moved through sealing sleeve 60, funnel seal 65 will be urged by the pressure of water in conduit 15 into sealing engagement with the interior surface of conduit 15. Sealing sleeve 60 and conduit opening sleeve 39 are both annular shaped and insure that conduit 51 is at least substantially circular as it passes over funnel seal 65 and opening element 38.

Stationary gripping sleeve 66 is supported by cross element 58 of frame 54, and movable gripping sleeve 69 is positioned rearwardly adjacent stationary gripping sleeve 66.

Figure 8:
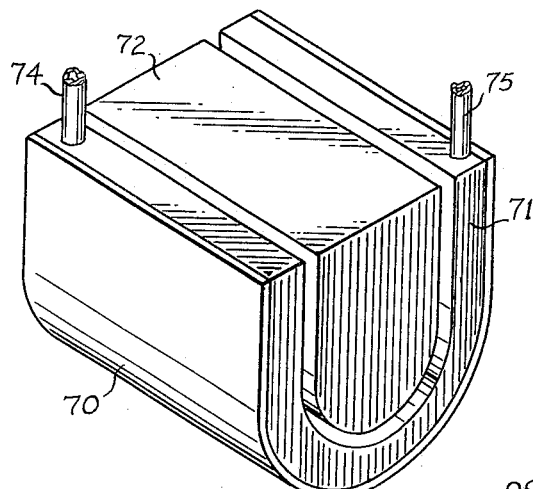
FIG. 8 is a perspective view of one of the gripping sleeves.

As is shown in FIG. 8, stationary gripping sleeve 66 comprises a U-shaped, rigid outer shell 70 and a collapsable liner 71. Interior plug 72 is positioned within shell 70 and its liner 71, and liner 71 is expandable into engagement with plug 72. Conduit 15 is inserted between plug 72 and liner 71 in an open condition with the joints 18 and 19 normally extending above gripping sleeve 66. Liquid inlet nozzles 74 and 75 communicate with liner 71 on opposite sides of plug 72, and function to allow liquid to be forced into or drained from liner 71. Thus, when liner 71 is inflated with liquid under pressure, it will expand against conduit 15 and plug 72, to grip conduit 15. Movable gripping sleeve 69 is substantially identical to stationary gripping sleeve 66.

Power cylinder 76 is mounted above movable gripping sleeve 69, and piston 77 is movable within cylinder 76. Piston rod 78 extends from cylinder 76, and is connected to movable gripping sleeve 69 by means of lugs 79. Spring 80 is positioned about piston rod 78, within cylinder 76, to urge piston 77 to the left (FIG. 5) or inwardly of cylinder 76. Ratchet wheel 81 is rotatably supported on its axle 82 from frame 54, and sheaves 83 and 84 are secured to ratchet wheel 81. Pawl 85 is connected to piston rod 78 and engages and rotates ratchet wheel 81 during its movement into cylinder 76. V-belt 86 extends around sheave 84 and a similar sheave attached to axle 57 of front wheels 55, so that rotation of ratchet wheel 81 and its sheave 84 results in the rotation of axle 57 and its wheels 55.

Control valve 86 is positioned adjacent piston rod 78 and includes valve housing 88 and valve spool 89. Shaft 90 of valve spool 89 extends from both ends of housing 88, and includes downwardly extending lugs 91 and 92. Valve shifting stanchion 94 is connected at one of its ends to piston rod 78 and extends toward valve housing 88. The movement of piston rod 78 will cause valve shifting stanchion 94 to engage lugs 91 and 92 of control valve 86 at the end of each inward and outward stroke of piston 77.

Control valve housing 88 defines inlet ports 95 and 96 adjacent its ends, relief port 98 at its center, and control ports 99 and 100 which are centrally located in each one-half portion thereof. Flow control spools 101, 102 and 103 are movable with rod 90 to control the flow of liquid through control ports 99 and 100.

Figure 6:
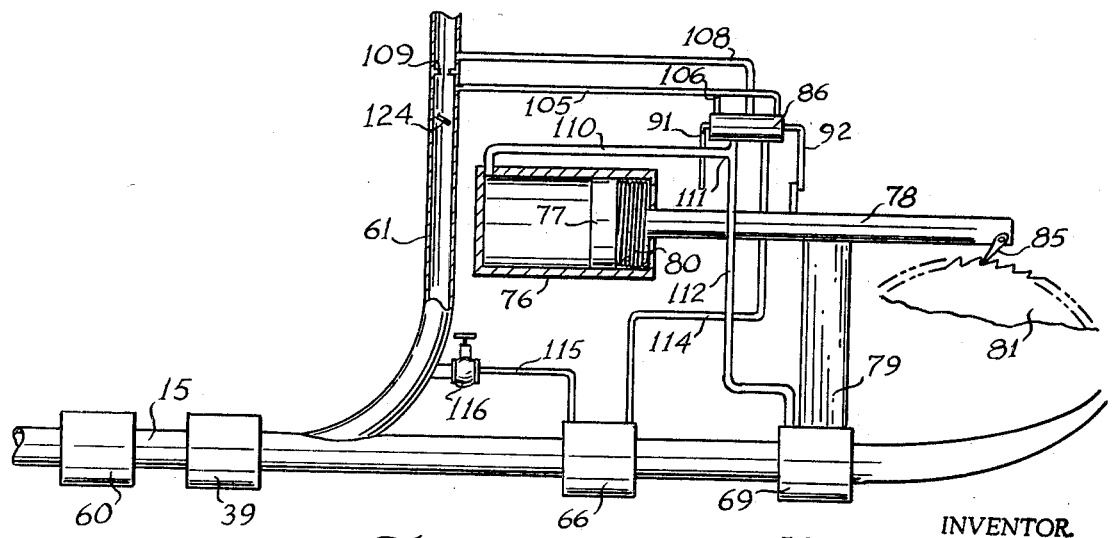
FIG. 6 is an enlarged side elevational view of the gripping sleeves, power piston, control valve, and extracting tube.

As is shown in FIG. 6, pressure hose 105 communicates at one of its ends with extractor pipe 61, and its other end divides at joint 106 and communicates with ports 95 and 96 of valve housing 88. Relief hose 108 communicates at one of its ends with relief port 98, and at the other of its ends with extractor pipe 61. Constriction 109 is formed internally of extractor pipe 61 to form a pressure differential between pressure conduit 105 and relief conduit 108. Control port 99 communicates with cylinder 76 inwardly of its piston 77 through hose 110 and joint 111, and with movable gripping sleeve 69 through hose 112. Control port 100 communicates with stationary gripping sleeve 66 through hose 114. Stationary gripping sleeve 66 also communicates with extractor pipe 61 through hose 115 and adjustable valve 116.

Take-up reel 118 is mounted from frame 54 by means of upwardly extending supports 119. Reel 118 is rotatable about its valve 120, and sheave 121 is rotatably connected to axle 120. V-belt 122 is connected to sheave 83 of ratchet wheel 81 so that reel 118 will rotate with and in response to the rotation of ratchet wheel 81. The opened portion of conduit 15 is extended around reel 118, and as control cart 14 moves over conduit 15, reel 118 collects the opened portion of conduit 15 and winds it in a flat spiral.

Extractor pipe 61 includes an on-off valve 124 which controls the flow of water through sprinkler head 125 and through pressure hose 105.

Handle 126 is connected to caster wheel 56 in such a manner that control car 14 can be pulled and guided to various locations.

OPERATION

When it is desired to operate the irrigation apparatus, control cart 14 with its reel 118 substantially filled with opened conduit 15 is moved to a location adjacent a hydrant or faucet, whereupon conduit 15 is connected to a source of water.

Control valve 124 (FIG. 6) is moved to its closed position so that water cannot communicate with sprinkler head 125 or pressure hose 105. Valve 116 is moved to its fully opened position. The hydrant to which conduit 15 is connected is then opened, whereupon extractor pipe 61 is filled to the point of its valve 124 with pressure. Water communicating through hose 115 with stationary gripping sleeve 66 causes liner 71 (FIG. 8) to expand and grip the open portion of hose 15 against plug 72. When the operator is ready to move control cart 14 away from the hydrant, he closes valve 116, thereby terminating the communication between stationary gripping sleeve 66 and extractor pipe 61, and allowing liner 71 to collapse. The pressure exerted from the hydrant through conduit 15 will cause cart 14 to be urged away from the hydrant. The operator then will guide and partially pull control cart 14 as necessary, by manipulation of handle 126, toward the area to be irrigated. The operator may guide the cart in a straight line away from the hydrant or in virtually any direction, curved, straight, or otherwise, from the hydrant.

Figure 10:
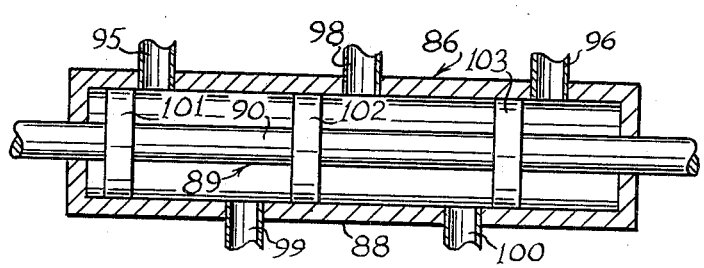

As the opened portion of conduit 15 is unreeled from reel 118, it passes through gripping sleeves 66 and 69, opening sleeve 39, and sealing sleeve 60. As conduit 15 passes through opening sleeve 39, the conduit is formed or closed by its points 18 and 19 being pressed into engagement with each other to form seam 16 by opening element 38. After control cart 14 has been moved in the direction and to the distance from the hydrant as desired by the operator, the operator opens valve 124 to allow the pressurized water from the hydrant to flow upwardly through extractor pipe 61, through sprinkler nozzle 125, and through pressure hose 105. The water flowing through pressure hose 105 communicates with each end of control valve 86. Since spring 80 of cylinder 76 will have moved piston 77 and its piston rod 78 and valve shifting stanchion 94 to the left (FIG. 6), valve spool 89 will be shifted to the left, as shown in FIG. 10, so that the water under pressure will flow through pressure port 95 and into control valve housing 88, and then from control valve housing 88 through control port 99 and hose 110, to cylinder 76 and powered gripping sleeve 69. Powered gripping sleeve 69 will grip conduit 15 by its liner 71 (FIG. 8) expanding into frictional engagement with conduit 15, and the water under pressure behind piston 77 will cause piston 77 to move to the right (FIG. 6), and carry powered gripping sleeve 69 to the right. Thus, stationary gripping sleeve 66 and powered gripping sleeve 69 will be moved away from each other, thereby causing stationary gripping sleeve 66 to be moved over conduit 15 toward the hydrant to which conduit 15 is connected. Of course, this movement causes control cart 14 to move in a similar manner.

Figure 9:
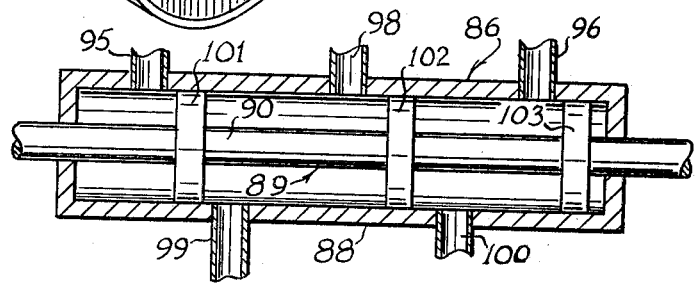
FIGS. 9 and 10 are schematic views of the control valve, showing the control valve spool moved to opposite ends of the valve cylinder.

As piston 77 reaches the end of its stroke, its valve shifting stanchion 94 will engage lug 92 of valve spool 89, so as to shift the valve spool to the right and cause it to take the position as shown in FIG. 9. When valve spool 89 has been shifted in this manner, the water under pressure entering port 95 of control valve housing 88 will be blocked by spool 101, while water pressure will flow through opening 96, into control valve housing 88, and out of control port 100, through hose 114 toward stationary gripping sleeve 66. In the meantime, the liquid from cylinder 76 and movable gripping sleeve 69 will be allowed to drain back through control valve 86, through relief port 98, and hose 108 to extractor pipe 61. Thus, movable gripping sleeve 69 will be allowed to relax and spring 80 will cause piston 77 to move inwardly of cylinder 76, while stationary gripping sleeve 66 takes a firm hold on conduit 15. When piston 77 reaches the inner end of cylinder 76, its valve shifting stanchion 94 will engage lug 91, to shift valve spool 89 back to the position as shown in FIG. 10, whereupon the cycle will be repeated.

Pawl 85 of piston rod 78 will slide over the teeth of ratchet wheel 81 when piston 77 is moved out of cylinder 76; however, when spring 80 moves piston 77 back into cylinder 76, pawl 85 will engage the teeth of ratchet wheel 81, to turn ratchet wheel 81 and its sheaves 83 and 84. V-belt 86' which extends between sheave 84 and the axle of front wheels 55 will assist control cart in its movement along conduit 15. Also, V-belt 122 which extends around sheave 83 of ratchet wheel 81 and sheave 121 of reel 118 will cause reel 118 to rotate about its axle 120 and collect the opened portion of conduit 15.

The cycle of operation of control cart 14 will be repeated until control cart 14 reaches a position adjacent to the hydrant to which conduit 15 is connected. The portion of conduit 15 adjacent the hydrant is coated with a slick substance so that gripping sleeves 66 and 69 will not be effective to move control cart against the hydrant and pull conduit 15 from the hydrant, or unduly wear the portion of conduit 15 adjacent the hydrant if the operator does not return in time to terminate the operation of the irrigation apparatus.

While drainage hose 108 leading from relief port 98 of control valve 86 is disclosed as communicating with extractor pipes 61, it will be understood that the amount of water flowing through hose 108 is comparatively small and can be vented to the ground. Furthermore, while piston 77 has been disclosed as utilizing spring 80 to move piston 77 inwardly of cylinder 76, it will be understood by those skilled in the art that hose 114 can also communicate with cylinder 76, so that the pressurized water flowing through the hose 114 will force piston 77 back into cylinder 76. This arrangement would provide a positive driving force for piston 77 when it is functioning to turn ratchet wheel 81. Furthermore, spring 80 could be utilized in combination with a double acting cylinder, so that its force will be additive to that of the pressurized liquid.

As is shown in FIGS. 4 and 5, when control cart 14 is moved along conduit 15, opening element 38 will cause joints 18 and 19 of seam 16 to be urged into or out of engagement with each other, depending upon the direction in which control cart 14 is moved, to form or open a fluid tight seam 16 along the length of conduit 15. Thus, conduit 15 is opened or closed as extractor pipe 61 is moved therealong, and the opened portion of conduit 15 can be conveniently reeled in or collected and stored in a configuration that occupies a minimum storage area. Also, the opening of conduit 15 allows the water to drain from the conduit before it is stored, so that control cart 14 is not burdened with the added weight and volume of the water inside the conduit.

At this point, it should be apparent that an improved method and apparatus for irrigating land area has been disclosed. It will be understood that while various specific components have been set forth in this disclosure, various other components can be substituted. For instance, ratchet wheel 81 could be conveniently replaced with a conventional water pressure actuated motor, control valve 86 can be modified in various different manners, control cart 14 can be mounted on a track where the path of water distribution is to be the same for repeated operations of the system, valves 116 and 124 can be constructed so as to be actuated by a timer or by limit switches at the ends of a track or other prescribed path to make the operation of the system completely automatic, and various other changes can be made. It will be obvious to those skilled in the art that many variations may be made in the embodiment chosen for the purpose of illustrating the present invention without departing from the scope thereof.

What is claimed as invention is:

1. Irrigating apparatus comprising a conduit openable along its length and connectable at one of its ends to a source of pressurized liquid, control means for progressively opening the conduit and extracting liquid from the conduit, propelling means comprising a pair of conduit gripping members movable toward and away from each other and longitudinally along the length of the conduit for moving said control means along the length of the conduit, and collecting means for progressively collecting the conduit in an empty condition as the pressurized liquid is being continuously removed from the uncollected portion of the conduit.

2. Fluid flow apparatus comprising a conduit connectable at one of its ends to a source of presurized fluid and defining an openable seam along its length, a fluid extracting apparatus connectable to the conduit and comprising a conduit opening means for opening the conduit as it moves along the length of the conduit, a duct member insertable into the opened portion of the conduit and movable with said conduit opening means and arranged to direct pressurized fluid out of the conduit, and conduit engaging means for gripping the conduit and urging said conduit opening means and said duct means along the length of the conduit.

3. The invention of claim 2 wherein said conduit engaging means comprises a pair of expandable conduit gripping members, reciprocating means connected to said conduit gripping members for moving said conduit gripping members toward and away from each other along the length of the conduit, and control means for alternately expanding said conduit gripping members in timed relationship with the movement of said conduit gripping members along the length of the conduit whereby said fluid extracting apparatus pulls itself along the length of said conduit.

4. The invention of claim 2 wherein said conduit engaging means comprises means for engaging the opened portion of the conduit.

5. The invention of claim 2 and further including branch duct means communicating between said duct member and said conduit engaging means for flowing pressurized fluid from said duct member to said conduit engaging means to power said conduit engaging means.

6. The invention of claim 2 and further comprising a conduit coiling mechanism mechanism movable with said fluid extracting apparatus and arranged to coil the opened portion of the conduit as the fluid extracting apparatus moves along the length of the conduit.

References Cited

UNITED STATES PATENTS

| | | | |
|---|---|---|---|
| 2,660,472 | 11/1953 | Rice | 239—190 |
| 3,011,502 | 12/1961 | Jordan. | |
| 3,019,813 | 2/1962 | Dommann. | |
| 3,217,725 | 11/1965 | Varian. | |
| 3,392,744 | 7/1968 | Varian. | |

ROBERT B. REEVES, Primary Examiner

H. S. LANE, Assistant Examiner

U.S. Cl. X.R.

239—190, 199